(12) United States Patent
Kwon et al.

(10) Patent No.: US 9,264,165 B2
(45) Date of Patent: Feb. 16, 2016

(54) METHOD AND APPARATUS FOR TRANSMITTING MESSAGE IN A MOBILE COMMUNICATION SYSTEM

(75) Inventors: Yeong Hyeon Kwon, Anyang-si (KR); Seung Hee Han, Anyang-si (KR); Hyun Hwa Park, Anyang-si (KR); Dong Cheol Kim, Anyang-si (KR); Hyun Woo Lee, Anyang-si (KR); Min Seok Noh, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 808 days.

(21) Appl. No.: 12/376,565

(22) PCT Filed: Aug. 8, 2007

(86) PCT No.: PCT/KR2007/003812
§ 371 (c)(1),
(2), (4) Date: Sep. 20, 2010

(87) PCT Pub. No.: WO2008/018750
PCT Pub. Date: Feb. 14, 2008

(65) Prior Publication Data
US 2011/0007715 A1    Jan. 13, 2011

(30) Foreign Application Priority Data

Aug. 8, 2006  (KR) .................. 10-2006-0074534

(51) Int. Cl.
*H04L 23/02*   (2006.01)
*H04J 13/00*   (2011.01)

(52) U.S. Cl.
CPC ................ *H04J 13/00* (2013.01); *H04L 23/02* (2013.01); *H04J 13/0059* (2013.01); *H04J 13/0062* (2013.01); *H04J 13/0074* (2013.01)

(58) Field of Classification Search
CPC ...... H04L 23/02; H04L 5/023; H04L 27/2613; H04J 13/00; H04W 74/00; H04W 72/04; H04W 28/04
See application file for complete search history.

(56) References Cited

U.S. PATENT DOCUMENTS

| | | | |
|---|---|---|---|
| 5,546,423 A * | 8/1996 | Sehier et al. | 375/141 |
| 2001/0046864 A1 | 11/2001 | Bhatoolaul et al. | |
| 2002/0118635 A1 * | 8/2002 | Nee | 370/210 |
| 2003/0026324 A1 * | 2/2003 | Li et al. | 375/141 |

(Continued)

FOREIGN PATENT DOCUMENTS

| KR | 10-2001-0092334 | 10/2001 |
|---|---|---|
| KR | 10-2002-0030367 | 4/2002 |

(Continued)

OTHER PUBLICATIONS

Korean Intellectual Property Office Application Serial. No. 10-2006-0074534, Notice of Allowance dated May 16, 2013, 2 pages.

*Primary Examiner* — Yee Lam
(74) *Attorney, Agent, or Firm* — Lee, Hong, Degerman, Kang & Waimey

(57) ABSTRACT

A method for transmitting a random access preamble from a user equipment is presented. The method includes generating the random access preamble by applying a circular shift to a code sequence having a sequence identifier, allocating the random access preamble to consecutive resource blocks, applying subcarrier spacing for the random access preamble to the consecutive resource blocks, and transmitting, via a transmitter of the user equipment, the random access preamble.

13 Claims, 11 Drawing Sheets

(56) References Cited

U.S. PATENT DOCUMENTS

| | | | |
|---|---|---|---|
| 2004/0082356 A1* | 4/2004 | Walton et al. | 455/522 |
| 2004/0170121 A1* | 9/2004 | Kim et al. | 370/208 |
| 2006/0050799 A1* | 3/2006 | Hou et al. | 375/260 |
| 2006/0098752 A1* | 5/2006 | Song et al. | 375/260 |
| 2006/0153282 A1* | 7/2006 | Jung et al. | 375/146 |
| 2007/0041311 A1* | 2/2007 | Baum et al. | 370/208 |
| 2007/0183386 A1* | 8/2007 | Muharemovic et al. | 370/344 |
| 2008/0260085 A1* | 10/2008 | Lin et al. | 375/362 |
| 2010/0158087 A1* | 6/2010 | Chin | 375/224 |
| 2010/0290405 A1* | 11/2010 | Arnott et al. | 370/329 |

FOREIGN PATENT DOCUMENTS

| | | |
|---|---|---|
| KR | 10-0374354 | 3/2003 |
| KR | 1020040005839 | 1/2004 |
| WO | 0128126 | 4/2001 |
| WO | 0239622 | 5/2002 |

* cited by examiner

FIG. 4
Prior Art
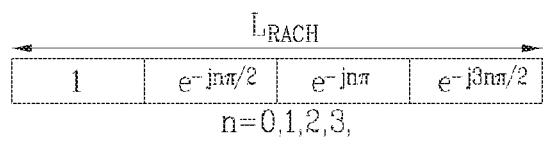
(a) Hierarchical preamble with orthogonal sequence
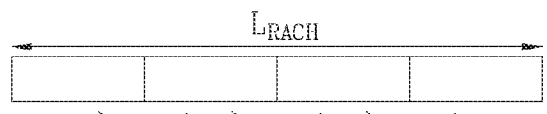
(b) Hierarchical preamble with differential PSK modulation sequence
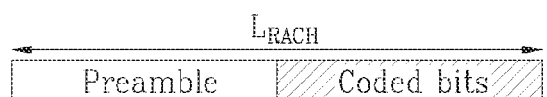
(c) Non-hierarchical preamble plus coded bits
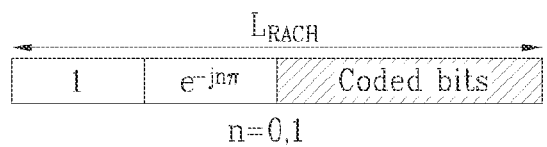
(d) Hierarchical preamble with orthogonal sequence plus coded bits.

FIG. 5
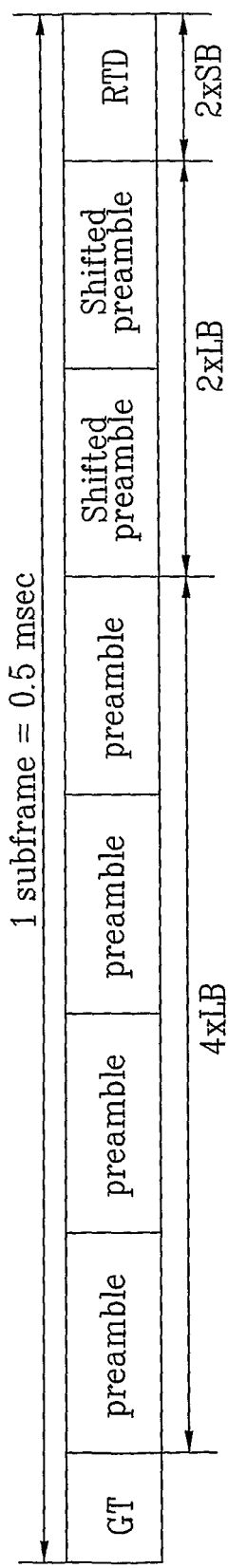
The proposed preamble structure in one RA burst : Candidate 1
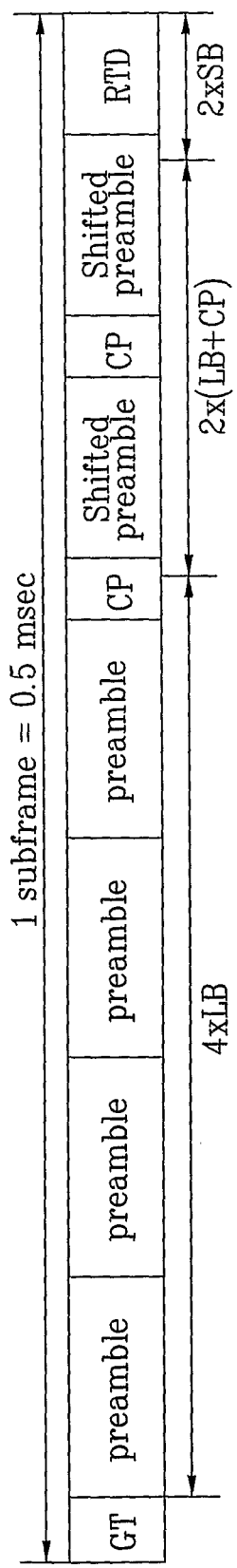
The proposed preamble structure in one RA burst : Candidate 2

A Sequence → ID
+
circular shift

Sequence only (a)

CP only (b)

CP + Repetition (c)

FIG. 11

| Random ID,RACH Cause | CQI,Buffer State | etc |

METHOD AND APPARATUS FOR TRANSMITTING MESSAGE IN A MOBILE COMMUNICATION SYSTEM

CROSS-REFERENCE TO RELATED APPLICATIONS

This application is the National Stage filing under 35 U.S.C. 371 of International Application No. PCT/KR07/03812, filed on Aug. 8, 2007, which claims the benefit of earlier filing date and right of priority to Korean Application No. 10-2006-0074534, filed on Aug. 8, 2006.

TECHNICAL FIELD

The present invention relates to mobile communication technologies, and more particularly, to a method and apparatus for transmitting a message using a code sequence in a mobile communication system.

BACKGROUND ART

A user equipment uses a random access channel (RACH) to access a network in a state that the user equipment is not uplink synchronized with a base station. The user equipment can perform initial ranging and periodic ranging through the RACH. The user equipment performs the initial ranging to acquire downlink synchronization and first access a base station, and performs the periodic ranging to instantaneously access a network if necessary in a state that the user equipment is connected with the network. The initial ranging is used to allow the user equipment to acquire synchronization while accessing the network and receive desired user equipment (UE) identifier during communication. The periodic ranging for accessing the RACH is used to initiate a protocol to receive information from the base station or when a transmission packet exists.

The periodic ranging can be classified into two types depending on 3GPP LTE (Long Term Evolution), i.e., a synchronized access mode and a non-synchronized access mode. The synchronized access mode is used if an uplink signal is within a synchronization limit when the user equipment tries access through the RACH. The non-synchronized access mode is used if the uplink signal is beyond the synchronization limit. The non-synchronized access mode has the same concept as the periodic ranging, and is used when the user equipment accesses the RACH for the purpose of notifying the base station of the change status of the user equipment and requesting resource allocation. On the other hand, the synchronized access mode alleviates limitation of a guard time in the RACH by assuming that the user equipment does not depart from uplink synchronization with the base station. For this reason, much more time-frequency resources can be used. In the 3GPP LTE, a considerable amount of messages (more than 24 bits) may be added to a preamble sequence for random access in the synchronized access mode so that both the preamble sequence and the messages may be transmitted together.

Hereinafter, the RACH which is being currently discussed in the 3GPP LTE system will be described.

FIG. 1 illustrates a structure of the RACH according to the related art.

It is assumed that a channel structure of the RACH which is currently discussed has a bandwidth of minimum 1.25 MHz and a length of minimum 1 sub-frame.

Although FIG. 1 illustrates one sub-frame, the RACH of FIG. 1 may increase to reach N number of sub-frames on a time axis depending on a cell radius. A time-frequency resource (TFR) of FIG. 1 is a transmission unit in the LTE, and generation frequency of the RACH is determined depending on QoS requirements in MAC layer. In other words, the RACH is generated once in a unit of several tens of ms or several hundreds of ms. Signals transmitted to the RACH should be characterized in that their detection can easily be performed in a time domain. To this end, various methods have been suggested, which are generally based on CAZAC (constant amplitude zero auto-correlation) sequence. The CAZAC sequence can be classified into two types, i.e., GCL CAZAC sequence and Zadoff-Chu CAZAC sequence. First of all, the GCL CAZAC sequence is given by the following Equations 1 and 2.

$$c(k; N; M) = b(\mod(k; m)) \cdot \exp\left(-\frac{j\pi Mk(k+1)}{N}\right) \quad \text{[Equation 1]}$$

(in case where N is an odd number)

$$c(k; N; M) = b(\mod(k; m)) \cdot \exp\left(-\frac{j\pi Mk^2}{N}\right) \quad \text{[Equation 2]}$$

(in case where N is an even number)

where b(mod(k;m)) determines a length of a zero-correlation zone of GCL-CAZAC and usually uses Hadamard or complex exponential sequence.

The Zadoff-Chu CAZAC sequence is given by the following Equations 3 and 4.

$$c(k; N, M) = \exp\left(\frac{j\pi Mk(k+1)}{N}\right) \quad \text{[Equation 3]}$$

(in case where N is an odd number)

$$c(k; N, M) = \exp\left(\frac{j\pi Mk^2}{N}\right) \quad \text{[Equation 4]}$$

(in case where N is an even number)

Examples of methods for transmitting data during random access using CAZAC sequence will be described below. The first method is to analyze CAZAC sequence ID as message information. The second method is to transmit CAZAC sequence and other sequence in a code division multiplexing mode, wherein CAZAC ID is used as unique UE identification information and other code mixed by the code division multiplexing mode is analyzed as message information. The third method is to mix the CAZAC sequence with another sequence (for example, Walsh sequence), wherein CAZAC ID is used as UE identification information and Walsh sequence is analyzed as message information. The fourth method is to directly perform data modulation for the CAZAC sequence, wherein CAZAC ID is used as UE identification information and modulated data is decoded to extract message. The fifth method is to transmit a message part attached to the CAZAC sequence, wherein the message part is transmitted in the same manner as the existing data transmission and CAZAC ID is used as UE identification information. The fifth method is mainly used in a synchronized random access channel.

Generally, the aforementioned data transmission methods can be classified into two types depending on message transmission through the RACH. In other words, the data transmission methods are classified depending on whether message is transmitted separately from a preamble sequence or transmitted by being implicitly included in the preamble sequence. In case of implicit transmission, the message occupies a time-frequency domain which is the same as that occupied by the preamble sequence. For example, in this case, CAZAC ID of the sequence is regarded as the message. If a sufficient number of messages that can be used as the preamble sequence are provided, message transmission can be performed with only sequence ID without additional manipulation. However, considering that maximum 24 bits are required when the RACH is actually implemented, it is difficult to obtain a sufficient number of sequence sets, and it takes the considerable cost required for detecting the sequence sets. For another example, sequence ID is simply used to identify a number used for random access by UE, and other additional information is transmitted simultaneously with preamble sequence.

FIG. 2 to FIG. 4 illustrate methods for transmitting a message a random access channel (RACH) in accordance with the related art.

Referring to FIG. 2, Walsh code which will be used as message is transmitted in a CDM mode simultaneously with the preamble sequence. According to the method of FIG. 2, the original CAZAC sequence is combined with Walsh sequence and then transmitted. In this case, since the original CAZAC sequence is combined with Walsh sequence, the method of FIG. 2 belongs to the CDM mode.

Referring to FIG. 3, Walsh sequence is directly mixed with the CAZAC sequence unlike the method of FIG. 2. In this case, message is identified as ID of Walsh sequence, and a base station uses the CAZAC sequence as UE identification information.

Referring to FIG. 4, another sequence is not mixed with the CAZAC sequence unlike the aforementioned methods. In case of the method of FIG. 4, data modulation is directly performed. In this case, data transmission can be performed for more data than those transmitted when the sequences are mixed. To transmit more data, messages may directly be transmitted following the preamble sequence as shown in (c) or (d) of FIG. 4.

The aforementioned transmission methods are to transmit much more message information while maintaining the characteristic of the CAZAC sequence if possible.

The aforementioned message transmission methods can be classified into two types in another aspect. That is, the one type is to use the sequence as it is while the other type is to attach another sequence to the original sequence. If the sequence is used as it is, the quantity of message which is transmitted increases to a value obtained by taking "$\log_2$" for the length of the sequence even though the length of the sequence becomes long. In this case, a problem occurs in that too long sequence is required for required message transmission. Meanwhile, if another sequence is attached to the original sequence, problems occur in that the characteristic of the CAZAC is degraded and performance may become bad rapidly depending on the channel status.

DISCLOSURE OF THE INVENTION

Accordingly, the present invention is directed to a method and apparatus for transmitting a message in a mobile communication system, which substantially obviates one or more problems due to limitations and disadvantages of the related art.

An object of the present invention is to provide a method of increasing data transmission efficiency in a mobile communication system.

Another object of the present invention is to provide a method and apparatus for transmitting a message in a mobile communication system, which allows transmission performance to be robust to channel characteristic while increasing data, information or message which is transmitted along with a preamble signal.

Other object of the present invention is to provide a method and apparatus for performing an unequal protection function of information, which determines a length of a code sequence depending on error characteristic of message which is transmitted.

To achieve these objects and other advantages and in accordance with the purpose of the invention, as embodied and broadly described herein, a method for transmitting a message using a code sequence in a mobile communication system comprises applying circular shift to a code sequence to represent information to be transmitted to a receiving side, the code sequence having ac sequence identifier, and transmitting the code sequence to which circular shift has been applied to the receiving side.

In another aspect of the present invention, an apparatus for transmitting a message in a mobile communication system comprises means for applying circular shift to a code sequence to represent information to be transmitted to a receiving side, the code sequence having a sequence identifier, and means for transmitting the code sequence to which circular shift has been applied to the receiving side.

In still another aspect of the present invention, a method for transmitting a message using a code sequence in a mobile communication system comprises allocating at least two code sequences having different lengths to one channel, each of the code sequences having a sequence identifier which identifies predetermined information, and transmitting the at least two code sequences to a receiving side through the channel.

In further still another aspect of the present invention, an apparatus for transmitting a message in a mobile communication system comprises means for allocating at least two code sequences having different lengths to one channel, each of the code sequences having a sequence identifier which identifies predetermined information, and means for transmitting the at least two code sequences to a receiving side through the channel.

BRIEF DESCRIPTION OF THE DRAWINGS

FIG. 2 to FIG. 4 illustrate methods for transmitting a message through RACH in accordance with the related art;

FIG. 5 illustrates conceptually an example of transmitting a message through RACH in accordance with one embodiment of the present invention;

FIG. 11 illustrates an example of a method of performing unequal protection depending on importance of information transmitted in accordance with another embodiment of the present invention.

BEST MODE FOR CARRYING OUT THE INVENTION

Figure 1:
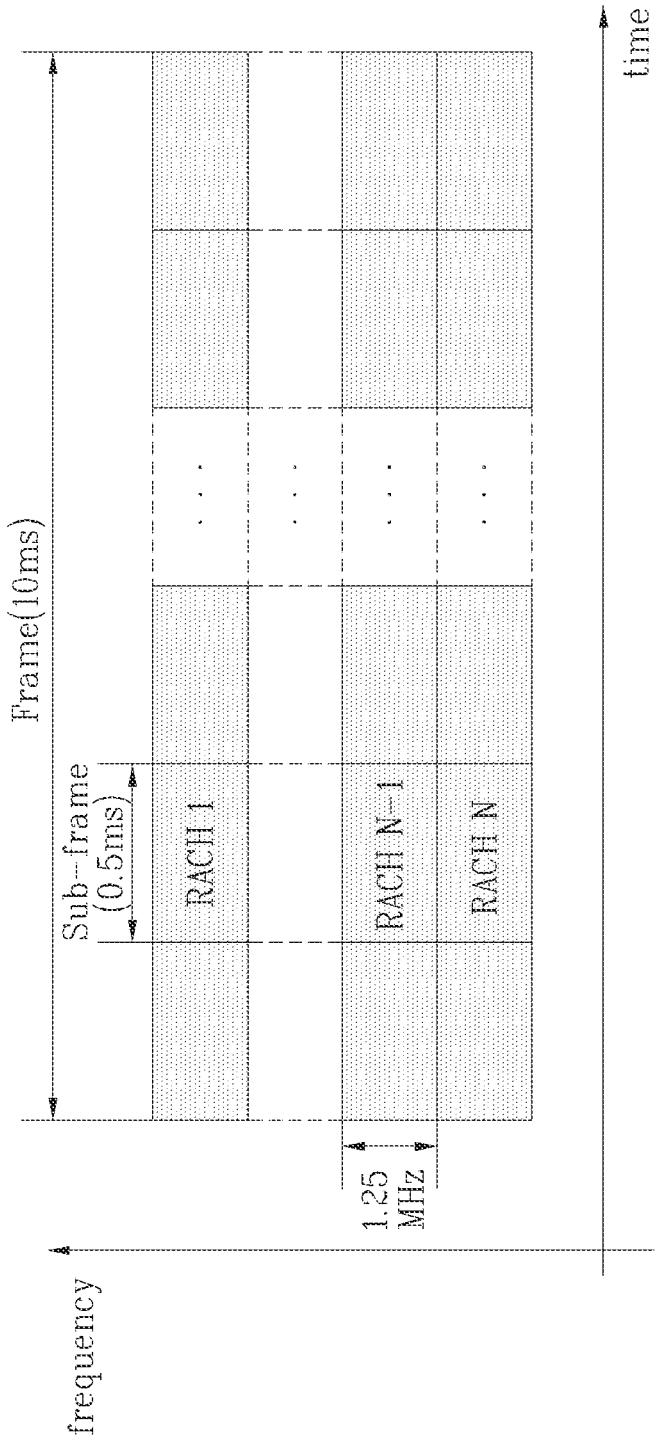
FIG. 1 illustrates a structure of a random access channel according to the related art.
Figure 2:
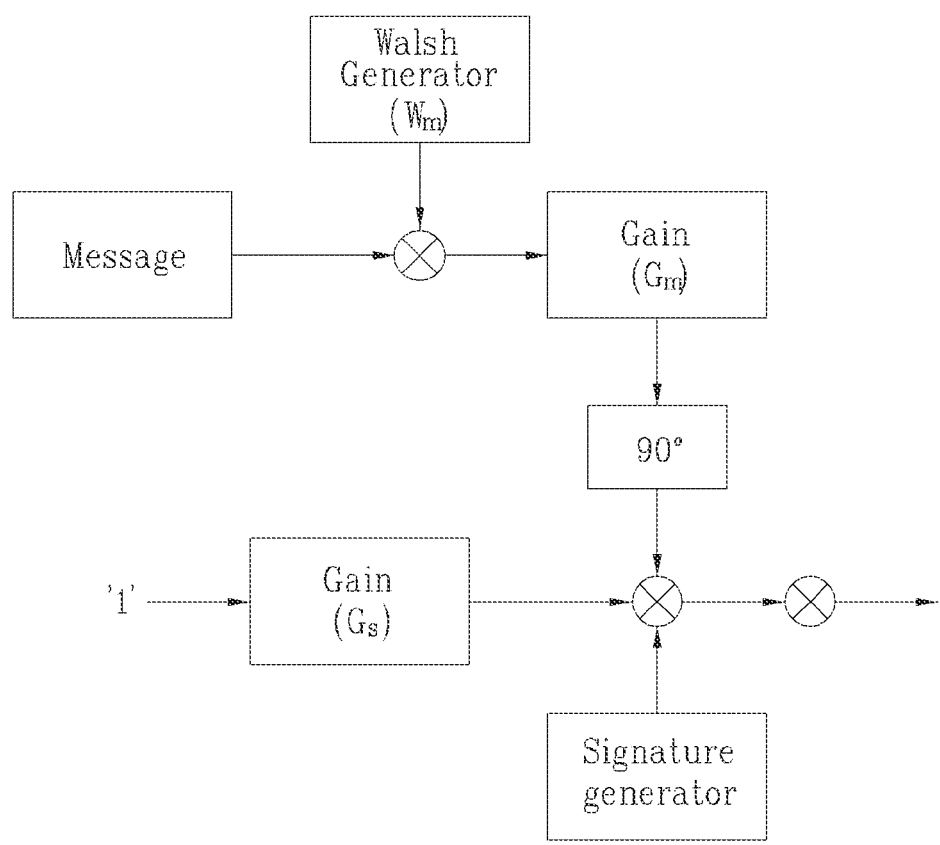
Figure 3:
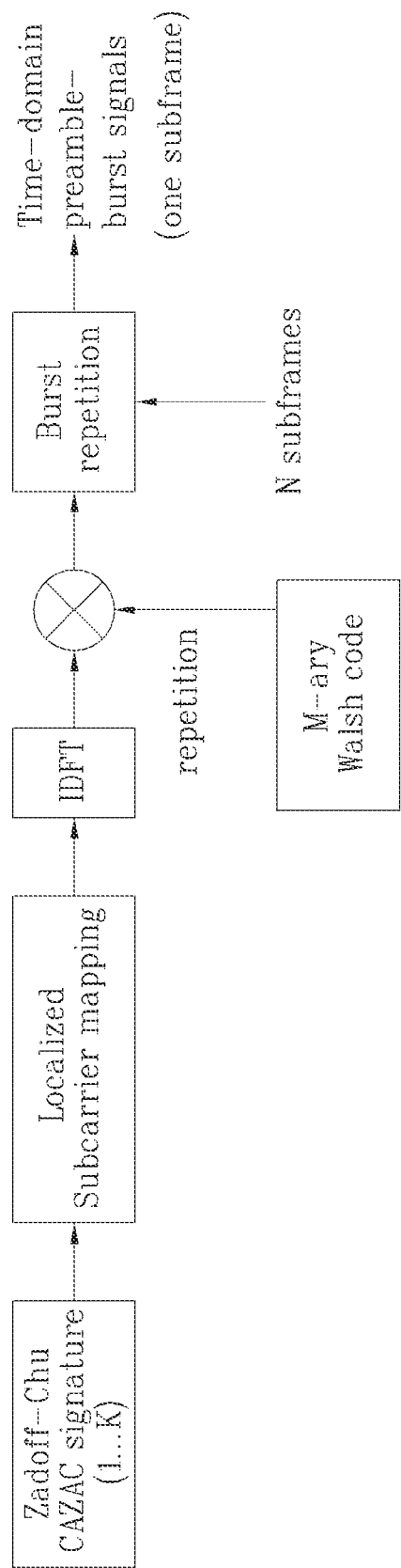

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment which the present invention can be carried out. Hereinafter, the detailed description includes detailed matters to provide full understanding of the present invention. However, it will be apparent to those skilled in the art that the present invention can be carried out without the detailed matters. To prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

One embodiment of the present invention relates to a method and apparatus for transmitting a message along with control information. Hereinafter, the method and apparatus for transmitting a message will be described based on embodiments of transmitting a message in a synchronized access mode or a non-synchronized access mode in a random access channel (RACH) used to synchronize a signal of a user equipment with a base station. It is assumed that a data transmission structure which does not deteriorate peak to average power ratio (PAPR) characteristic is basically designed based on unequal protection.

To this end, there is suggested an embodiment of a method of increasing the quantity of messages, which can be transmitted, by applying circular shift to a CAZAC sequence having an identifier (ID) for information transmission or a method of transmitting a message along with CAZAC ID by determining a length of a sequence to be suitable for error characteristic of message (i.e., unequal protection) and applying circular shift to the determined sequence. In this case, maximum number of IDs can be satisfied and at the same time more messages can be transmitted.

Signals which will be transmitted through the RACH are not related with types of code sequences (hereinafter, referred to as "sequence"). It is preferably required that the sequence be easily detected at a receiving side. It is preferable that user equipments can easily be identified if the sequences are easily identified from one another. Hereinafter, CAZAC sequences will be described as examples. However, it is to be understood that the present invention is not limited to the CAZAC sequences.

Since the CAZAC sequence has zero-autocorrelation characteristic, the receiving side can easily identify different CAZAC IDs and different circular shifts. However, another code sequences may be used instead of the CAZAC sequences in message transmission using circular shift in accordance with one embodiment of the present invention.

FIG. 5 illustrates conceptually an example of transmitting a message through the RACH in accordance with one embodiment of the present invention.

According to the embodiment of FIG. 5, short preamble sequences are repeated to transmit predetermined information (for example, UE ID), and a preamble to which circular shift is applied is transmitted at the latter half of the sub-frame to represent additional message. In this way, message transmission can be performed by additional information obtained by circular shift and information obtained from preamble sequence ID.

Message transmission using circular shift as shown in FIG. 5 is superior to the related art message transmission structure in that degradation of the existing CAZAC correlation characteristic and degradation of the PAPR characteristic due to message transmission can be minimized. However, if circular shift is applied to a short sequence and such a short sequence is repeated as shown in FIG. 5, a problem occurs in that exact message transmission may not be performed due to spread of transmission channel, which is caused by the short sequence. Accordingly, the message transmission according to another embodiment of the present invention suggests message transmission based on an extent of circular shift by applying circular shift to a sequence having a sequence ID.

Figure 6:
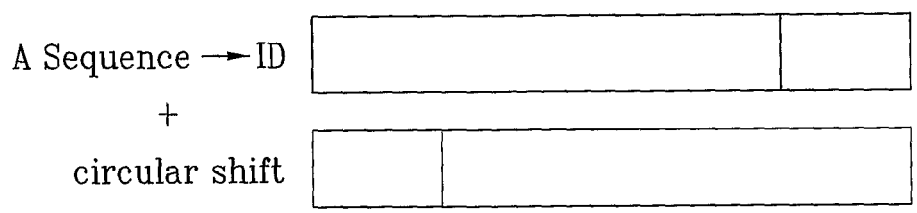
FIG. 6 illustrates a method for transmitting a message by applying circular shift to the entire of sequences transmitted through RACH in accordance with another embodiment of the present invention.

FIG. 6 illustrates a method for transmitting a message by applying circular shift to a sequence transmitted through the RACH in accordance with another embodiment of the present invention.

As shown in FIG. 6, a structure of RACH signal which will be generated has a basic type as follows. First of all, a sequence which can represent information to be transmitted, for example, a sequence ID identifying UE ID is selected. The selected sequence ID is identification information of the selected sequence, and is minimum information that can be transmitted with the sequence. To allow the sequence to become the actual RACH signal, the sequence can be converted into a sequence in a time domain or a frequency domain. Circular shift is applied to the selected sequence by a delay value corresponding to the extent of circular shift which represents predetermined information. Namely, the data transmission structure according to the embodiment of the present invention, specifically the RACH channel structure has a structure in which circular shift is applied to the entire of the sequence having the sequence ID corresponding to information to be transmitted by the extent of circular shift which represents the predetermined information. In other words, a transmitting side represents information to be transmitted to the receiving side depending on the extent of circular shift of the selected sequence, and the receiving side identifies the extent of circular shift of the sequence received from the transmitting side to acquire information to be transmitted from the transmitting side.

When circular shift is applied to the sequence as above, the quantity of information that can be transmitted will be described in more detail.

First of all, if the length of the selected sequence is N, the quantity of information that can be transmitted using the sequence having the length of N becomes a maximum integer number which does not exceed $\log_2 N$. Also, the quantity of information that can be transmitted through circular shift applied to the entire sequence becomes a maximum integer number which does not exceed $\log_2(N_d)$, wherein $N_d$ is the number of circular shift values that can be represented by the sequence having the length of N. If delay spread of channel is $N_{CH}$, $N_d$ can be represented by $N/N_{CH}$. After all, in case of the channel signal structure according to the embodiment of the present invention, when the number of information that can be represented through the channel signal structure is $N_{RACH}$, it can be expressed by the following Equation.

$$n_{RACH} = \lfloor \log_2(N) \rfloor + \lfloor \log_2(N_d) \rfloor \qquad \text{[Equation 5]}$$
$$= \lfloor \log_2(N) \rfloor + \left\lfloor \log_2\left(\frac{N}{N_{CH}}\right) \right\rfloor$$

where $\lfloor X \rfloor$ means a maximum integer which does not exceed x.

If circular shift is applied to the selected sequence, the entire length N of the sequence increases as compared with the case where circular shift is applied to the short sequence as shown in FIG. 5. Also, the number $N_d$ of circular shift values increases as the number N increases. Thus, it is possible to increase the quantity of data that can be transmitted. Moreover, if circular shift is applied to the short sequence, the number of circular shift values that can be applied by delay spread of the channel can be limited. If data transmission is performed by application of circular shift in a unit smaller than that of delay spread of the channel, a problem occurs in that exactness may be reduced when the receiving side detects the quantity of circular shift applied to the sequence. However, the problem can be solved by the method of applying circular shift to the entire sequence.

Meanwhile, a region to which circular shift is applied may be a region where the sequence is currently generated or another region other than the region where the sequence is generated. In other words, circular shift may be applied to the sequence converted into a time domain signal if the sequence is generated in a frequency domain, and vice versa.

Although FIG. 6 illustrates the case where circular shift is applied to the region where the sequence is applied to the RACH signal, circular shift may be applied to the sequence represented in another region. After circular shift is applied to the sequence as shown in FIG. 6, the actual RACH signal is generated. The method of applying circular shift can be classified as follows depending on the region to which the corresponding sequence is applied to the RACH signal and the region to which circular shift is applied:

1) in the case where the sequence is applied to the RACH signal in the frequency domain and circular shift is applied to the sequence in the same frequency domain;

2) in the case where the sequence is applied to the RACH signal in the frequency domain and circular shift is applied to the sequence generated by converting the frequency domain into the time domain;

3) in the case where the sequence is applied to the RACH signal in the time domain and circular shift is applied to the sequence in the same time domain; and 4) in the case where the sequence is applied to the RACH signal in the time domain and circular shift is applied to the sequence generated by converting the time domain into the frequency domain.

As above, the method of applying circular shift in the region where the sequence is generated or applied or in the region other than the region where the sequence is generated or applied can be expressed by the following Equation.

$$s(k)=c(\text{mod}(k-d), N)), k=1, 2, \ldots, N \qquad \text{[Equation 6]}$$

where d represents a delay value indicating the extent of circular shift, c(k) represents a sequence which will be applied to the channel before application of circular shift, s(k) represents a sequence to which circular shift is applied, and N represents length of sequences to be applied to the channel. As can be seen from the Equation 6, although the sequence s(k) generated by applying 'mod' function based on N to sequences delayed by 'd' has the same length as that of c(k), it is generated as the sequence delayed by 'd' and the structure of the generated sequence is as shown in FIG. 6.

The aforementioned embodiments are based on circular shift, and a method of multiplying complex exponential sequences in the region other than the region where circular shift is applied has the same effect as that of the method based on circular shift. In other words, application of circular shift in the time domain is the same as multiplication of complex exponential sequences in the frequency domain while application of circular shift in the frequency domain is the same as multiplication of complex exponential sequences in the time domain. As described above, the sequence s(c,d) to which circular shift is applied by 'd' for the sequence c(k) can be expressed by the following Equation.

$$s(c,d)=[c(N_c-d+1), c(N_c-d+2), \ldots, c(N_c-1), c(N_c),$$
$$c(1), c(2), \ldots, c(N_c-d)] \qquad \text{[Equation 7]}$$

Also, the Equation 7 has the following relation with Fourier transform.

$$F^{-1}s(c,d)=c_e F^{-1}c \qquad \text{[Equation 8]}$$

where $c_e$ means $$c_e = \left[\exp(0), \exp\left(\frac{j2\pi d}{N_0}\right), \ldots, \exp\left(\frac{j2\pi d}{N_0}(N_0-1)\right)\right].$$

Accordingly, to obtain the type of FIG. 6, any one of Equation 7 or Equation 8 may be used. If the signal is generated as shown in FIG. 6 to transmit the RACH signal, message can be carried in sequence ID and 'd' which is the extent of circular shift.

According to another embodiment of the present invention, a signal which represents a specific message is transmitted through a sequence ID or 'd' indicating the extent of circular shift, so that the message is transmitted in an uplink.

Hereinafter, a method of actually applying the sequence to the RACH signal in accordance with another embodiment of the present invention will be described.

Figure 7:
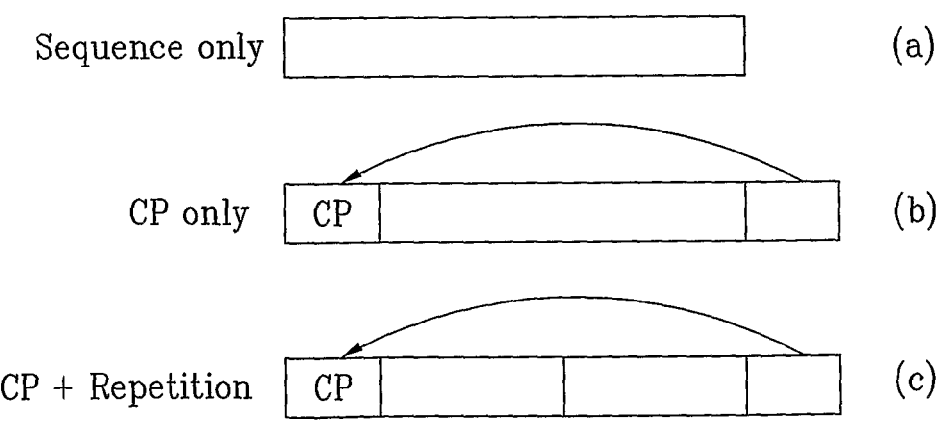
FIG. 7 illustrates a structure as to how a random access channel signal generated from sequence is implemented in an actual time domain when RACH signal is transmitted in accordance with another embodiment of the present invention.

FIG. 7 illustrates a structure as to how the RACH signal generated from the sequence is implemented in the actual time domain when the RACH signal is transmitted in accordance $$s(c,d)=[c(N_c-d+), c(N_c-d+2), \ldots, c(N_c-1), c(N_c),$$
$$c(1), c(2), \ldots, c(N_c-d)]$$

with another embodiment of the present invention.

Generally, three types of methods may be used to implement the RACH signal. The first type of method is to transmit the RACH signal generated from the sequence to the time domain as it is. The second type of method is to reduce distortion due to multi-path by attaching a cyclic prefix to the generated time domain signal. The third type of method is to allow the aforementioned cyclic prefix and the transmission signal to have a repetitive structure, thereby detecting signal timing from the repetitive pattern at the receiving side.

The RACH signal can be implemented depending on whether sequence application is OFDM or CDM. In case of OFDM, sequence for RACH is carried in specific sub-carriers to generate a time domain signal. In case of CDM, the sequence is directly transmitted from the time domain. Even in case of OFDM, application of the sequence can be performed in the time domain. Even in case of CDM, the sequence can be generated in the frequency domain.

If a sequence to be transmitted is $s_R = \{s_R(1), s_R(2), \ldots, s_R(N_{sR})\}$ and the RACH signal is generated in the frequency domain, it is convenient that a modulation method such as OFDM is used. In other words, if a sub-carrier vector is $s_0 = \{s_0(1), s_0(2), \ldots, s_0(N_0)\}$, the sequence is allocated to the sub-carrier of the frequency domain at a certain mapping rule as follows.

$$s_0(i_R) = s_R(k), k = 1, 2, \ldots, N_{sR} \quad \text{[Equation 9]}$$

where $i_R$ is previously determined in accordance with the mapping rule, and may be allocated to successive sub-carriers or distributed sub-carriers. Considering the RACH, it is more effective that the $i_R$ is allocated to the successive sub-carriers (localized resource block) separate from another message information than that the $i_R$ is allocated to the distributed sub-carriers (distributed resource block) composite with another message information. If the allocated vector $s_0$ is converted into the time domain, the following Equation is given.

$$x_0 = F^{-1} s_0 \quad \text{[Equation 10]}$$

where F means a Fourier transform matrix. The method shown in (a) of FIG. 7 is to transmit $x_0$ of the Equation 10 as it is. The method shown in (b) of FIG. 7 is to transmit $x_0$ along with cyclic prefix as follows.

$$\hat{x}_O = \{x_O(N_O - N_C + 1), x_O(N_O - N_C + 2), \ldots, x_O(N_O - 1), x_O(N_O), x_O(2), \ldots, x_O(N_O)\} \quad \text{[Equation 11]}$$

The method shown in (c) of FIG. 7 is to allocate $i_k$ in a successive manner, wherein the sequence is allocated to the sub-carriers per two intervals in a sub-carrier unit to obtain $x_0$ repeated twice per one symbol in the time domain. In this way, $x_0$ is transmitted along with the cyclic prefix.

If the sequence is directly transmitted from the time domain, $x_0 = s_R$ is obtained. According to the method in (a) of FIG. 7, $x_0$ is transmitted as it is. According to the method in (b) of FIG. 7, $x_0$ is transmitted through conversion such as the Equation 11. According to the method in (c) of FIG. 7, $x_0$ is transmitted along with the cyclic prefix as shown in the Equation 11 after simple repetition of sequence such as $x_0 = [s_R, s_R]$.

As described above, in the sequence structure applied to the RACH signal, the delay value 'd' which represents the extent of circular shift can be used for message transmission, and sequence ID can also be used for message transmission. In information that can be transmitted through sequence ID, although the quantity of information except for information for identifying user equipments which have transmitted the RACH signal can be used for data transmission, required information and data may be transmitted through various kinds of combination that can be represented through the extent of circular shift and sequence ID.

Figure 8:
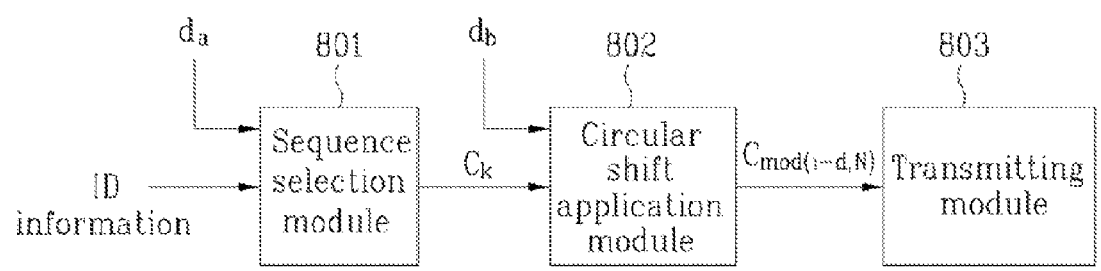
FIG. 8 illustrates an apparatus for transmitting a message by applying circular shift to sequences transmitted through RACH in accordance with another embodiment of the present invention.

Meanwhile, FIG. 8 illustrates an apparatus for transmitting a message by applying circular shift to sequences transmitted through the RACH in accordance with another embodiment of the present invention.

The apparatus for transmitting a message according to the embodiment of the present invention includes a sequence selection module 801 selecting a sequence having specific ID, a circular shift application module 802 applying circular shift by the extent of corresponding circular shift for message transmission, and a transmitter 803 transmitting the channel signal generated as above.

First of all, the sequence selection module 801 receives transmission information through the RACH signal including ID information of the user equipment to select a sequence $c_k$ having ID that can identify the information. Also, in the data structure according to the embodiment of the present invention, since the part that can be used for message transmission includes sequence ID and the extent of circular shift, the sequence selection module 801 may receive predetermined data $d_a$ to select additional sequence for identifying the data $d_a$ as shown in FIG. 8.

The sequence $c_K$ selected by the sequence selection module 801 is input to the circular shift application module 802. The circular shift application module 802 according to the embodiment of the present invention determines the extent of circular shift for identifying data $d_b$ to be transmitted to the receiving side and applies the determined extent of circular shift to the entire sequence. If circular shift is applied to the entire sequence $c_K$ as above, it is possible to increase the quantity of message that can be transmitted as compared with the case where circular shift is applied to the sequence of a short length and allow the receiving side to analyze circular shift applied to a longer sequence, thereby increasing exactness in message transmission.

The sequence (for example, $c_{mod(i-d,N)}$) to which circular shift is applied by the circular shift application module 802 is forwarded to the transmitter 803 and then transmitted through the uplink for information transmission including the aforementioned message.

Meanwhile, a method of increasing capacity for message transmission by applying circular shift to the entire sequence in accordance with another embodiment of the present invention will be described, wherein the method is based on unequal protection of information and uses sequences having different lengths depending on types of information which is transmitted.

Figure 9A:
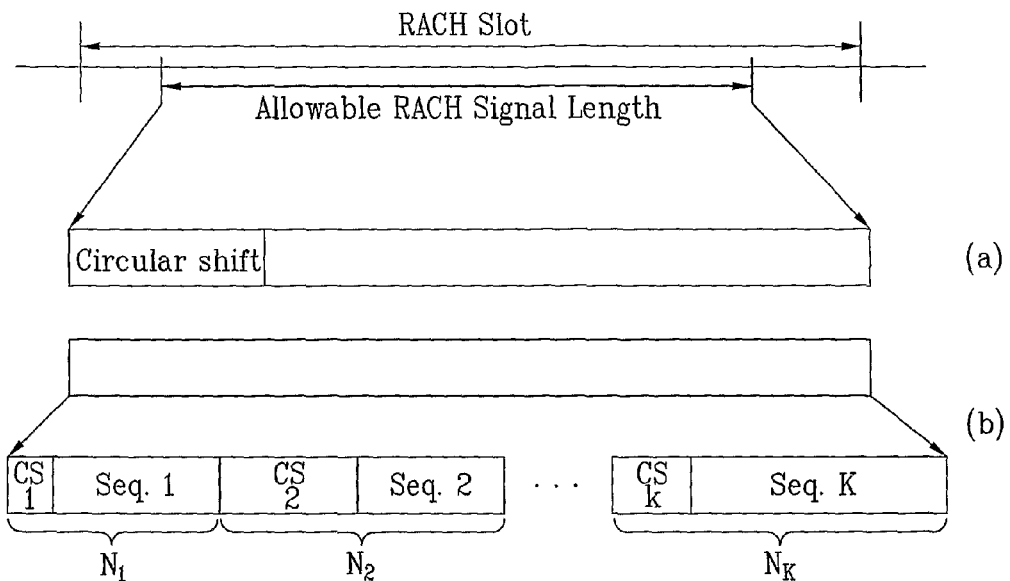
FIG. 9A to FIG. 9C illustrate methods for transmitting data, in which lengths of sequences transmitted through RACH are selected depending on importance of information in accordance with another embodiment of the present invention.
Figure 9B:
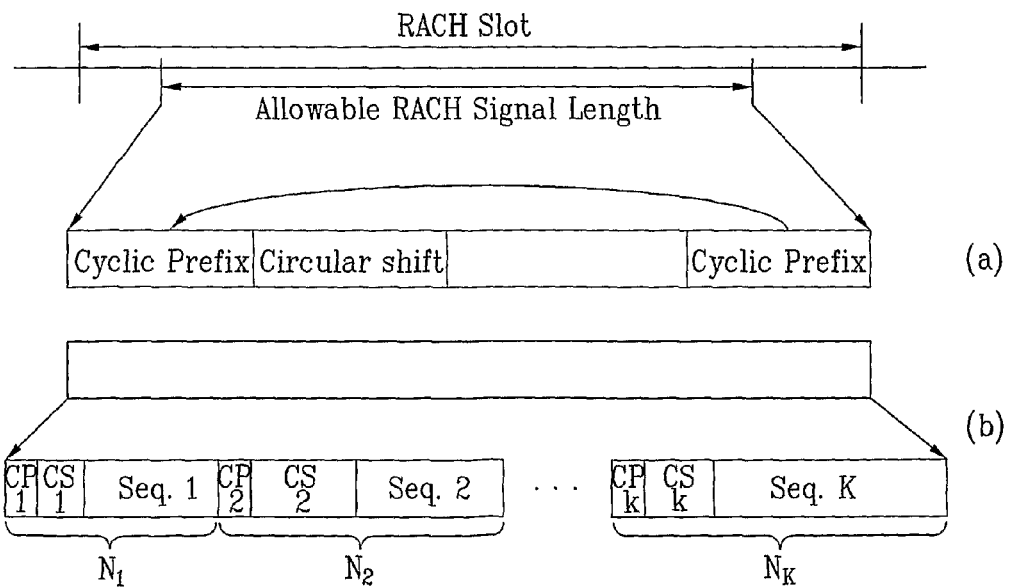
Figure 9C:
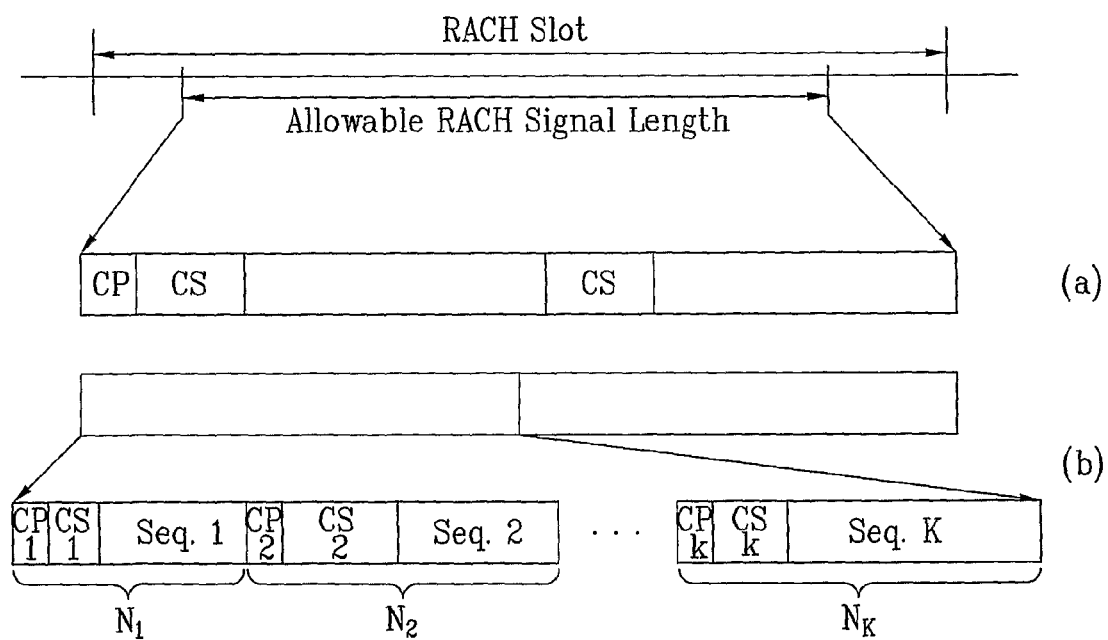

FIG. 9A to FIG. 9C illustrate methods for transmitting data, in which lengths of sequences transmitted through the RACH are selected depending on importance of information in accordance with another embodiment of the present invention.

The number of bits that can be transmitted through circular shift or sequence ID increases as the length of the sequence becomes long. However, since the increase speed of bits increases by a value obtained by taking $\log_2$ as described above, it is difficult to sufficiently increase the number of bits as much as increase of the length. Meanwhile, since there is limitation in the signal power of the time domain when the RACH signal is transmitted, better detection performance can be obtained as the length of the sequence becomes long. Accordingly, when several sequences are sequentially transmitted through one RACH, different detection performances, i.e., unequal protection can be obtained by adjusting the length of the sequence. In other words, predetermined information can be transmitted to the receiving side by the method of sequentially transmitting sequences having different lengths through the RACH. At this time, message transmission may be considered in such a manner that information to be protected most greatly, for example, UE identification information is represented by the longest sequence and the other information is allocated with short sequence. Thus, unequal protection can be performed depending on importance of each of information, and the quantity of information that can be transmitted through the same sequence can be increased. The receiving side can acquire predetermined information depending on the length of a plurality of sequences received through the RACH, wherein the information is previously determined between the receiving side and the transmitting side.

For another example, circular shift may be applied to each of a plurality of sequences sequentially transmitted through the RACH to transmit additional information to the receiving side. FIG. 9A to FIG. 9C illustrate how the circular shifted sequence is implemented when the circular shifted sequence is transmitted depending on each signal type. In FIG. 9A, (a) illustrates an example of one RACH slot which includes a single sequence to which circular shift is applied, and (b) illustrates an example of one RACH slot which includes a plurality of sequences to which circular shift is applied. In (b) of FIG. 9A, the length of each sequence may depend on information represented by the corresponding sequence. In FIG. 9B, (a) illustrates an example of transmitting one sequence through one RACH slot after cyclic prefix is inserted into the sequence to which circular shift is applied, and (b) illustrates an example of transmitting a plurality of sequences through one RACH slot after cyclic prefix is inserted into the sequences. In FIG. 9C, (a) illustrates an example of transmitting repetitive sequences through one RACH slot after cyclic prefix is inserted into the repetitive sequences to which circular shift is applied, and (b) illustrates an example of repeatedly transmitting the structure of (b) of FIG. 9B through one RACH slot.

The data transmission structure according to the embodiment of the present invention may have sequence lengths proportional to importance of each of information. Also, the data transmission structure has a structure in which sequences having sequence ID corresponding to each of information are sequentially concatenated. Moreover, the data transmission structure may have a structure that circular shift is additionally applied to each of the sequences as much as the extent of circular shift which represents a specific message.

When a plurality of sequences are transmitted as described in the embodiments shown in FIG. 9A to FIG. 9C, the sequence length has the following characteristic.

$$N_1 + N_2 + \ldots + N_K = N_R \leq N_{RACH} \quad \text{[Equation 12]}$$

where $N_R$ is a length of the RACH signal that can actually be transmitted in the RACH channel, and $N_{RACH}$ is a length of the RACH. If transmission is performed by division as above, the number $N_{RACH}$ of bits that can be transmitted is given by the following Equation.

$$n_{RACH} = \sum_{j=1}^{K} (\lfloor \log_2(N_j) \rfloor + \lfloor \log_2(N_d^j) \rfloor) \quad \text{[Equation 13]}$$

where $\lfloor x \rfloor$ means a maximum integer which does not exceed x as described above, and $N_d^j$ means the number of circular shift values that can be represented in the jth sequence and its limit is determined delay spread $N_{CH}$ of the channel as described above. Considering this, the Equation 13 can be expressed by the following Equation.

$$n_{RACH} = \sum_{j=1}^{K} \left( \lfloor \log_2(N_j) \rfloor + \left\lfloor \log_2\left(\frac{N_j}{N_{CH}}\right) \right\rfloor \right) \quad \text{[Equation 14]}$$

The Equation 13 or the Equation 14 illustrates signal capacity corresponding to the case where information transmission through the sequence and information transmission through the extent of circular shift applied to the sequence are independently performed. Alternatively, information transmission may be performed by information matching in such a manner that information that can be transmitted through the jth sequence may be associated with information that can be transmitted through the extent of circular shift which is applicable to the sequence. In this case, the number $n_{RACH}$ of bits that can be transmitted can be expressed as follows.

$$n_{RACH} = \quad \text{[Equation 15]}$$
$$\sum_{j=1}^{K} \lfloor \log_2(N_j N_d^j) \rfloor \geq \sum_{j=1}^{K} (\lfloor \log_2(N_j) \rfloor + \lfloor \log_2(N_d^j) \rfloor)$$

If information transmission is performed as shown in FIG. 9A to FIG. 9C, the structure of the RACH depends on the number of bits to be transmitted. In determining the transmission type, if performance greater than a certain level which is previously determined is required when the receiving side receives the RACH signal, the length of the sequence should be determined in accordance with the performance level. For example, if the number of bits to be detected with a probability $P_d$ is $n_P$, the sequence length is determined as follows. First of all, the sequence length $N_j$ and the minimum sequence length for transmitting the bits $n_p$ through the delay spread value $N_{CH}$ of the channel are determined by the Equation 14. If receiving signal energy in each sample is average $E_p$, the total quantity of energy obtained from the sequence of the length $N_j$ is $N_j E_p$. When receiving noise power is $\sigma_n^2$, Gaussian noise should satisfy the following condition.

$$\int_0^{\sqrt{N_j E_P}} \exp\left(-\frac{x^2}{2\sigma^2}\right) \geq \frac{P_d}{2} \quad \text{[Equation 16]}$$

In other words, if the minimum integer which satisfies the Equation 16 is obtained from the $N^j$ condition obtained from the Equation 14, the required detection probability and the transmission bits can be satisfied. Accordingly, information bits can be transmitted to the RACH at different unequal protection probabilities, and the total number of bits which are transmitted can be adjusted.

Furthermore, although the bits may be adjusted by the length only as above, similar effect can be obtained by adjustment of the use interval of circular shift. In other words, another unequal protection function can be implemented in each sequence group by using the principle of error possibility which increases or decreases as the interval of circular shift becomes narrow or wide.

Figure 10:
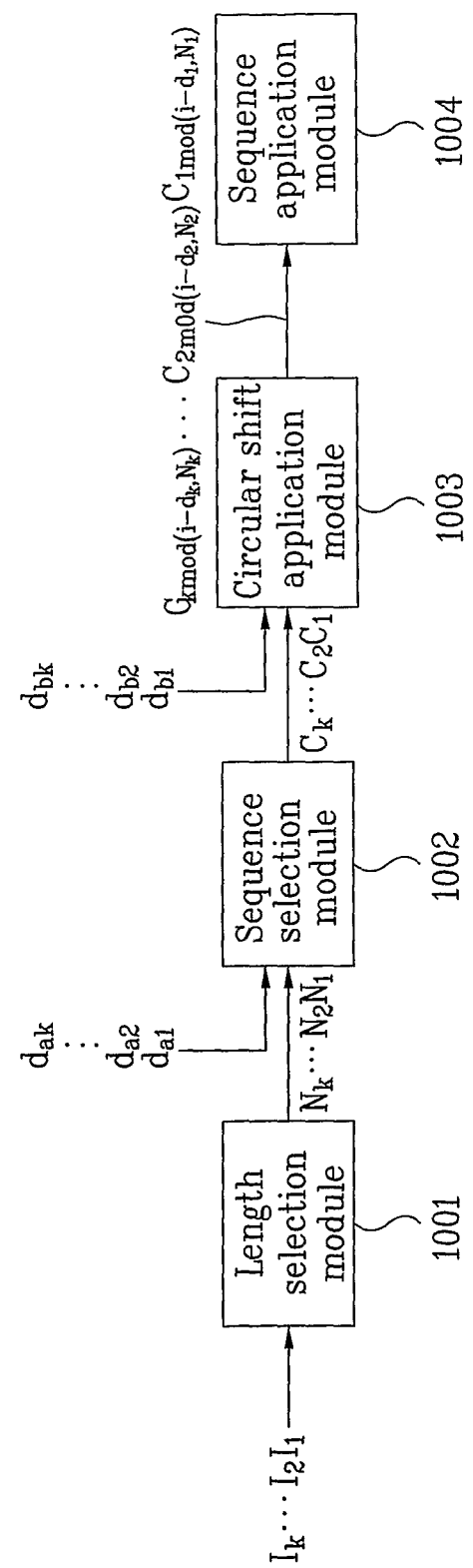
FIG. 10 illustrates an apparatus for transmitting data, in which lengths of sequences transmitted through RACH are selected depending on importance of information in accordance with another embodiment of the present invention.

Meanwhile, FIG. 10 illustrates an apparatus for transmitting data, in which lengths of sequences transmitted through RACH are selected depending on importance of information in accordance with another embodiment of the present invention.

The apparatus for transmitting data, which is shown in FIG. 10, includes a length selection module 1001 selecting the length of the sequence, a sequence selection module 1002 selecting the sequence having specific ID depending on information which is transmitted, and a transmitter 1004 transmitting the generated sequence. The apparatus may further include a circular shift application module 1003 applying circular shift to transmit more messages through the transmitted sequence.

First of all, the length selection module 1001 receives various kinds of information to be transmitted and determines importance of each of information. In this case, the length selection module 1001 selects the length of the sequence considering the detection probability required for specific information. In other words, in case of information which is required to be transmitted at the greater detection probability, the length selection module 1001 selects the length of the sequence to transmit each of information in such a manner to allocate the longer sequence. Of course, since the entire length of the sequences should be less than the total length of the RACH signal to be transmitted, the length selection module 1001 can allocate the sequence length to each of information considering the total length of the RACH signal.

Information ($N_1, N_2, \ldots, N_K$) for the length allocated to each of information by the length selection module 1001 is forwarded to the sequence selection module 1002. The sequence selection module 1002 has sequence ID that can identify each of information to be transmitted based on the length information, and selects sequences ($C_1, C_2, \ldots, C_K$) having lengths given by the length selection module 1001.

Furthermore, according to the embodiment of the present invention as described above, the apparatus includes the circular shift application module 1003, applies circular shift for predetermined message transmission to each of the selected sequences ($C_1, C_2, \ldots, C_K$) to increase information capacity of the sequence. If circular shift is applied as above, the sequences are applied to the RACH by the sequence application module 1004 to generate the RACH signal.

Figure 11:
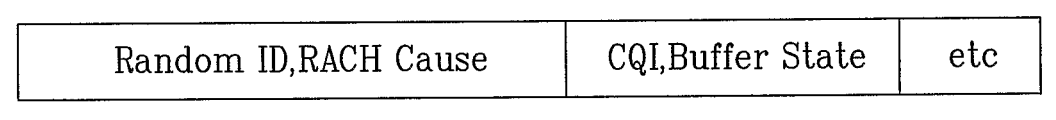

FIG. 11 illustrates an example of a method of performing unequal protection depending on importance of information to be transmitted in accordance with another embodiment of the present invention. Referring to FIG. 11, information which the base station can identify basic information of the user equipment which accesses the RACH, such as random ID selected by the user equipment or the case accessing the RACH (RACH cause), is transmitted using the longest sequence to increase the detection probability, and information such as CQI or buffer status, which is relatively less important, is transmitted using the shorter sequence. The other useful information is transmitted through less protection. It will be apparent to those skilled in the art that the example of FIG. 11 is only exemplary to describe the concept of the unequal protection function of the present invention, and the present invention is not limited to the example of FIG. 11.

The aforementioned method and apparatus for transmitting a message according to one embodiment of the present invention has the following advantages. It is possible to increase the quantity of information that can be transmitted without degrading the PAPR characteristic of the channel signal by applying circular shift to the entire sequence having ID which indicates specific information. As a result, it is possible to transmit more messages and reduce error when the receiving side detects information as compared with the case where circular shift is applied to the short sequence.

Furthermore, in the aforementioned method and apparatus for transmitting a message according to another embodiment of the present invention, since different sequence lengths are selected depending on importance of information to be transmitted, the unequal protection function of the information can be performed. If the RACH signal is transmitted by division for each of information, it is possible to increase information transmission capacity.

Moreover, if circular shift for message transmission is applied to each of the sequences having different lengths depending on importance of each of information, it is possible to increase information transmission capacity more and more.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

The invention claimed is:

1. A method for transmitting a mapped circularly shifted random access preamble, the method comprising:
   generating, by a user equipment (UE), a circularly shifted random access preamble by applying a circular shift value to a code sequence having a sequence identifier,
   wherein the circular shift value comprises a predetermined delay value, and
   wherein the circularly shifted random access preamble is generated by:
      selecting a length of the code sequence based on a detection probability desired for specific information to be transmitted, the length and the desired detection probability corresponding to an importance of the specific information; and
      based on the selected length, selecting the code sequence having the sequence identifier depending on the importance of the specific information to be transmitted;
   mapping, by the UE, the circularly shifted random access preamble to a plurality of subcarriers within consecutive resource blocks having random access preamble subcarrier spacing by using a random access channel subcarrier spacing variable to determine a starting subcarrier among the plurality of subcarriers that are within the consecutive resource blocks; and
   transmitting, by the UE, the mapped circularly shifted random access preamble.

2. The method of claim 1, wherein:
   applying the circular shift value comprises multiplying a complex exponential function by the code sequence in a first region;
   the first region is different from a second region where the code sequence is generated.

3. The method of claim 2, wherein generating the circularly shifted random access preamble comprises inserting a cyclic prefix in the code sequence after applying the circular shift value to the code sequence.

4. The method of claim 2, wherein the code sequence includes a repetitive structure in a time domain.

5. The method of claim 2, wherein the sequence identifier corresponds to predetermined information.

6. The method of claim 1, wherein generating the circularly shifted random access preamble comprises inserting a cyclic prefix in the code sequence after applying the circular shift value to the code sequence.

7. The method of claim 1, wherein the code sequence includes a repetitive structure in a time domain.

8. The method of claim 1, wherein the sequence identifier corresponds to predetermined information.

9. The method of claim 8, wherein the predetermined information includes an identifier for transmitting the code sequence.

10. The method of claim 1, wherein generating the circularly shifted random access preamble comprises inserting a cyclic prefix in the code sequence after applying the circular shift value to the code sequence.

11. The method of claim 1, wherein the code sequence includes a repetitive structure in a time domain.

12. The method of claim 1, wherein the sequence identifier corresponds to predetermined information.

13. An apparatus comprising:
a transmitter; and
a processor operatively connected to the transmitter and configured to
generate a circularly shifted random access preamble by applying a circular shift value to a code sequence having a sequence identifier,
wherein the circular shift value comprises a predetermined delay value, and
wherein the circularly shifted random access preamble is generated by:
select a length of the code sequence based on a detection probability desired for specific information to be transmitted, the length and the desired detection probability corresponding to an importance of the specific information; and
based on the selected length, select the code sequence having the sequence identifier depending on the importance of the specific information to be transmitted;
map the circularly shifted random access preamble to a plurality of subcarriers within consecutive resource blocks having random access preamble subcarrier spacing by using a random access channel subcarrier spacing variable to determine a starting subcarrier among the plurality of subcarriers that are within the consecutive resource blocks; and
transmit the mapped circularly shifted random access preamble.

* * * * *